Jan. 3, 1939. L. A. MELTZER Re. 20,963
THEATER CHAIR
Original Filed July 10, 1933
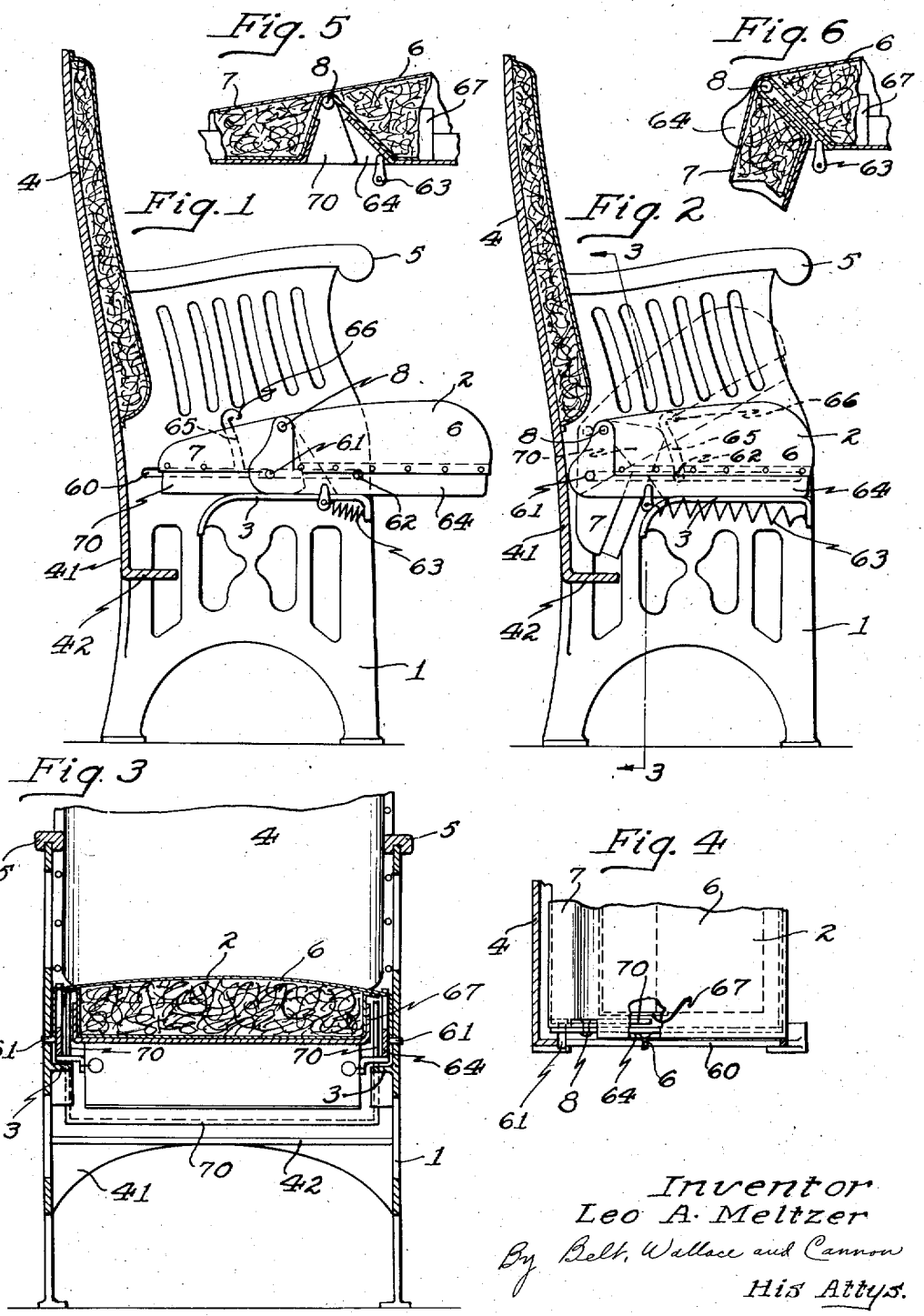
Inventor
Leo A. Meltzer
By Belt, Wallace and Cannon
His Attys.

Reissued Jan. 3, 1939 Re. 20,963

UNITED STATES PATENT OFFICE 20,963

THEATER CHAIR

Leo A. Meltzer, Seattle, Wash.

Original No. 2,078,961, dated May 4, 1937, Serial No. 679,730, July 10, 1933. Application for reissue September 13, 1938, Serial No. 229,771

19 Claims. (Cl. 155—85)

My invention relates to theater chairs or the like, and is equally adapted to individual chairs or to the several chairs of a group formed as a single unit. In a theater one is often disturbed by a person passing in front of his chair between the rows of seats. Heretofore the seats of theater chairs have been pivotally supported, so that they may be swung upward against the backs, but in a chair of this type, to allow someone to pass, the chair occupant must stand in order to make room sufficient to allow a person to pass between the occupant and the back of the chair ahead. This is disturbing to the person who must rise, and also to persons behind him, whose view is cut off until the occupant of the seat in front has again seated himself and rearranged warps, packages, etc.

My invention eliminates the necessity of a spectator rising to allow someone to pass by providing a chair seat which is movable relative to the support. Thus the occupant may merely move the seat to the rear in order to withdraw his knees sufficiently to provide passing room in front of the chair.

Another object of my invention is to provide a theater chair having such a movable seat which will not interfere with anyone passing or seated behind the chair for any position of the seat, and which has no parts projecting from the rear of the chair when the seat is moved to the rear.

A further object is to provide a chair seat which is not only movable or slidable to the rear, but which may be tilted up and locked in a rearward position when the chair is not being occupied, in order to facilitate sweeping and to remove the seat projection from the aisle when the seat is not occupied.

A still further object of my invention is to provide such a theater chair which may have all the comforts found in any conventional type of theater chair, and which has plenty of room underneath so that a person sitting behind may stretch forward his legs.

Other objects of my invention will more particularly be set forth in the following description of a preferred form of the theater chair.

My invention comprises the novel construction described in this specification, illustrated in the accompanying drawing, and defined in the claims appended to this specification.

Figure 1 is a sectional elevation of my theater chair seen from the side with the seat in the normal sitting position. Figure 2 is a similar view showing the seat slid to a rearward position.

Figure 3 is a sectional elevation of my theater chair, looking from the front, on the line 3—3 of Figure 2.

Figures 4, 5 and 6 are detail views of the seat construction.

In its preferred form my theater chair includes a standard 1 on which a seat 2 is slidably supported on slides 3. While the standard constitutes a general support for the seat, the member 3 is termed the support, since it is the immediate support for the seat. The chair may have the conventional back 4 and arms 5.

The seat itself is composed of a plurality of sections, and I have shown a front section 6 and a rear section 7 hingedly connected at 8. The seat is guided for substantially horizontal linear movement by pins 61 and 62 moving in grooves 60 formed in the standard 1 at each side of the seat. Movement of the seat both forward and rearward is limited by engagement of these pins with the ends of the slots. A spring or springs 63 connected between the seat and the standard continually urges the seat forward into the normal sitting position.

The hinge 8 joins side plates 64 of the front section with plates 70 of the rear section, so that the hinge lies substantially in the upper plane of the seat. With this construction no gap occurs between the two sections when one is swung relative to the other. This construction is equally adapted for upholstered and plain seats, but for the latter type a different type of hinge might be used, and the plates 64 and 70 could be dispensed with. In an upholstered seat, as shown, I prefer to use an inner plate 67 to form a pocket in the upholstering within which the end of plate 70 may move.

The operation of the seat will be apparent from the foregoing description. When the occupant desires to let someone pass he merely slides back, which moves the seat to the rearward position, whereupon the rear section, being unsupported, since it has slid rearwardly of the horizontal portion of the slides or supports 3, swings downward relative to the front section and the support in the position shown in Figure 2. If wraps are thrown over the seat back, they are not disturbed by this rearward movement of the seat, and no disturbance of persons in the rear is occasioned by the necessity of the seat occupant rearranging them. Parcels held in the lap are similarly undisturbed. After the person has passed, the occupant may again slide the seat forward, assisted by springs 63. The rear section 7 will be brought back into substantially horizontal position by engagement with the downwardly curved rear portions of the slides 3, and will be supported in the plane of the front section by the horizontal portion of this slide.

In order to move the seat out of the way for sweeping and cleaning purposes, or when unoccupied, it may be slid to the rear whereupon the rear seat section 7 will drop down and the front seat section 6 may be tilted upwardly about the hinge 8. The pin 62 will be guided in the slot 65 extending upwardly from the slot 60 and terminating in notches 66. The spring 63, tending to urge the seat forward, will hold it in this upraised position by urging the pin 62 into the notches 66, as seen in Figure 2. A slight backward push on the seat in this position will release the pin, and the seat may then be easily swung down and moved to the normal forward position.

In order to protect the feet and legs of a person sitting behind, a guard 41 may be provided which I have shown formed integral with the back 4, which will extend down below the rear seat section when it has been swung downward, as seen in Figure 2. A further guard 42 may extend forward from the guard 41 beneath the rear section when it is swung downward, in order to prevent a foot of the person behind being caught between the rear section of the seat and the chair back, thus to prevent injury to such person in the rear, or interference with free operation of the seat.

What I claim as my invention is:

1. A theater chair or the like comprising a member provided with a ledge, a seat including a front section and a rear section hingedly connected to the front section, said seat being slidable rearwardly and forwardly on said ledge, the latter, in the forward position of the seat, engaging beneath both sections to maintain them in a common plane, and being of such length that, in the rearward position of the seat, the rear section is unsupported and swings downwardly, to decrease the effective length of the seat as a whole.

2. A theater chair or the like comprising a standard having a substantially horizontal slot, a seat slidably supported for movement relative thereto between a forward and a rearward position, and guide pins moving in said slot, and normally restraining the seat for linear movement, and said standard having a further slot therein extending upwardly from the horizontal slot and behind the position assumed by the foremost of said guide pins when the seat is in its forward position, such upwardly extending slot being adapted to guide the foremost of said guide pins for upward movement when the seat is slid to its rearward position, to tilt the seat.

3. The combination of claim 2, and a notch at the terminus of the upwardly extending slot, wherein the foremost of the guide pins may engage when the seat is tilted upwardly, and a spring urging such pin into the notch, thus to hold the seat in a tilted position.

4. A theater chair or the like comprising a standard, a support, a seat slidably supported on said support for movement between a forward and a rearward position, and including a front section and a rear section, a hinge interconnecting said two seat sections about which the rear section may swing downward relatively to the support when the seat is slid to such rearward position, said front seat section being adapted to be swung upwardly relative to the said rear seat section and about said hinge as a pivot, when the seat is slid to such rearward position, guide means interengageable between said standard and said front seat section for guiding the latter into its upwardly swung position, and means to maintain said seat in its rearward position, the rear section thereof being swung downwardly and the front section being swung upwardly relatively to said support.

5. A theater chair or the like comprising a standard, a support thereon, a seat supported on said support and including a main section and a rear section, a hinge interconnecting said main and rear sections about which the latter may swing downward below the normal plane of the seat into a downwardly swung position, and guard means at the back of said standard disposed behind the rear seat section and extending therebelow when it is in its downwardly swung position.

6. The combination of claim 5, and a member extending forward from the bottom portion of the guard means, beneath the rear seat section when it is in its downwardly swung position.

7. The combination of claim 5, and a back fixed to the standard, the guard means being formed as a downward continuation of said back, terminating a substantial distance above the floor level.

8. A theater chair or the like comprising a standard, a seat supported therefrom for sliding movement rearwardly by the chair occupant and for tilting movement about a transverse axis when in its rearward position, means interengaged between the seat and standard to prevent such tilting movement until the seat is in rearward position, and a single means acting between the seat and the standard to urge the seat, when not tilted, into a forward position, and when tilted, to resist movement of the seat away from such tilted position.

9. A theater chair or the like comprising a seat including a front and a rear section hingedly connected, and movable from a normal forward position to a rearward retracted position, a single support engaging beneath both sections, at each side, and constituting the sole support for both sections when in the forward position, to maintain them in a common plane, and said support being of such length that, in the rearward position, the rear section is unsupported and swings downwardly, to decrease the effective length of the seat as a whole.

10. A theater chair or the like comprising a seat including a front and a rear section, a transverse hinge connecting such sections and disposed substantially in the plane of the upper surface of the seat, means slidably supporting said seat sections for movement from a forward to a rearward position including a member disposed beneath said seat, and of such length that in the forward position of the seat it supports the rear section and front section in coplanar relation, but in the rear position of the seat it leaves the rear section unsupported, whereby the latter swings on said hinge to decrease the effective length of the seat as a whole, said supporting means including means constraining the front section to sliding movement in its own plane, during movement between such forward and rear positions.

11. A theater chair or the like comprising a seat including a front and a rear section, a transverse hinge connecting such sections, an upholstered cushion on each seat section, a continuous seat cover extending from the rear cushion forwardly over the front section, past the hinge joint therebetween, the axis of such hinge lying substantially in the plane of said seat cover, supporting means including a member disposed beneath and supporting the seat for sliding movement to forward and rearward positions, and of such length that in the forward position of the seat it supports the rear section and front section in coplanar relation, but in the rear position of the seat it leaves the rear section unsupported, whereby the latter swings on said hinge to decrease the effective length of the seat as a whole, said supporting means constraining the front section to sliding movement in its own plane, during movement between such forward and rear positions.

12. In a seating construction, a supporting frame, a seat including at least two seat sections one of which is a front seat section and another of which is a rear seat section, means interconnecting the said seat sections for movement together as a unit and for movement relative to each other, and means carried by said supporting frame and cooperating therewith to support the said seat sections for movement into and out of rearward and forward positions, said supporting means including parts cooperating with the said rear seat section to guide the latter into a downwardly swung position, relative to the said front seat section, when the said seat is moved into its rearward position, said supporting means retaining the upper surface of the said front seat section in substantially the same plane, and against movement therefrom, during movement of the said front seat section into and out of its rearward and forward positions.

13. In a seating construction, a supporting frame, a seat including at least two seat sections one of which is a front seat section and another of which is a rear seat section, means interconnecting the said seat sections for movement together as a unit and for movement relative to each other, and means carried by the said supporting frame and cooperating therewith to support the said seat sections for movement into and out of rearward and forward positions, said supporting means including trackways and each of said trackways including a substantially horizontally extending front portion and a downwardly extending rear portion, and members carried by the said seat and movable along said trackways.

14. In a seating construction, a supporting frame, a box seat including at least two upholstered seat sections one of which is a front seat section and another of which is a rear seat section, means interconnecting the said seat sections for movement relative to each other and together as a unit, means carried by the said supporting frame and cooperating therewith to support the said seat sections for movement into and out of rearward and forward positions and in which latter or forward position the upper surfaces of said upholstered seat sections lie in a substantially common plane and cooperate with each other to provide an upholstered seating surface, said supporting means including trackways, and members carried by said seat and movable along said trackways, each of said trackways including a substantially horizontally extending front portion and a downwardly extending rear portion so that when the said seat is moved into its rearward position the said rear seat section will move downwardly relative to the said front seat section and the upper surface of the then downwardly extending rear seat section will be disposed out of the plane of, and out of cooperative relationship with, the upper surface of the said front seat section, said supporting means retaining the upper surface of the said front seat section in substantially the same plane, and against movement therefrom, during movement of the said front seat section into and out of its rearward and forward positions.

15. In a seating construction, a supporting frame, a box seat including at least two upholstered seat sections one of which is a front seat section and another of which is a rear seat section, means interconnecting the said seat sections for movement relative to each other and together as a unit, means carried by the said supporting frame and cooperating therewith to support the said seat sections for movement into and out of rearward and forward positions and in which latter or forward position the upper surfaces of said seat sections lie in a substantially common plane and cooperate with each other to provide an upholstered seating surface, said supporting means including parts cooperating with said rear seat section to guide the latter into a downwardly swung position relative to the said front seat section when the said seat is moved into its rearward position and in which position the upper surface of the then downwardly extending rear seat section will be disposed out of the plane of, and out of cooperative relationship with, the upper surface of the said front seat section, said supporting means retaining the upper surface of the said front seat section in substantially the same plane, and against movement therefrom, during movement of the said front seat section into and out of its rearward and forward positions.

16. The seating construction defined in claim 12 which is especially designed and intended for use as a theater chair and in which the seat is a box seat consisting of an upholstered front seat section and an upholstered rear seat section mechanically interconnected, adjacent the upper surfaces thereof, and in which the seat is provided with a cover extending over and concealing the joint between said front seat section and said rear seat section.

17. The seating construction defined in claim 13 which is especially designed for use as a theater chair and in which the seat is a box seat consisting of an upholstered front seat section and an upholstered rear seat section mechanically interconnected, at their meeting edges and adjacent the upper surfaces thereof, and in which the seat is provided with a cover extending over and concealing the joint between said front seat section and said rear seat section.

18. In a seating construction, a supporting structure, a seat structure carried by said supporting structure and including a plurality of seat sections movable relative to each other and into and out of rearward and forward positions, and means for guiding said seat structure into and out of its forward and rearward positions, said guiding means including trackways carried by one of said structures and means carried by the other one of said structures and engageable with said trackways, each of said trackways including a downwardly extending rear portion.

19. In a seating construction, a supporting structure, a seat structure carried by said supporting structure and including a front seat section and a rear seat section movable relative to each other and into and out of rearward and forward positions, and means including cooperable parts carried by said structures for guiding said seat structure into and out of its rearward and forward positions, said guiding means including parts cooperating with said rear seat section for guiding the latter into a downwardly extending position, relative to the said front seat section, as the said seat structure is moved into its rearward position, said guiding means retaining the upper surface of said front seat section in substantially the same plane in both the forward and rearward positions of said front seat section, and against movement therefrom during movement of the said seat structure into and out of its rearward and forward positions.

LEO A. MELTZER.